United States Patent [19]

Wesche et al.

[11] 4,229,393

[45] Oct. 21, 1980

[54] METHOD OF PRODUCING SAND-LIME BRICKS WITH A LOW BULK DENSITY

[76] Inventors: Karlhans Wesche, Lohmühlenstrasse 5a; Peter H. Schubert, Königshügel 34; Horst W. Glitza, Westend 15, all of Aachen, Fed. Rep. of Germany, 5100

[21] Appl. No.: 935,758

[22] Filed: Aug. 22, 1978

Related U.S. Application Data

[63] Continuation of Ser. No. 692,747, Jun. 4, 1976, abandoned.

[51] Int. Cl.$^2$ ............................................. C04B 35/14
[52] U.S. Cl. ..................................... 264/42; 106/120; 264/82; 264/333
[58] Field of Search ..................... 264/63, 333, 82, 42; 106/120

[56] References Cited

U.S. PATENT DOCUMENTS

| 3,226,242 | 12/1965 | Huettemann | 106/120 |
| 3,438,853 | 4/1969 | Haines et al. | 264/333 |
| 3,764,357 | 10/1973 | Bowles et al. | 264/333 |

Primary Examiner—John A. Parrish
Attorney, Agent, or Firm—Finnegan, Henderson, Farabow, Garrett & Dunner

[57] ABSTRACT

A method for producing sand-lime bricks of low bulk density and having a green strength of at least 1 kp/cm$^2$ in which at least 1% by weight of cement is added to a mixture of sand, lime and water and the mixture is then compacted in molds by vibration or under a pressure of less than 150 kp/cm$^2$ to form bricks which are subsequently cured.

15 Claims, No Drawings

METHOD OF PRODUCING SAND-LIME BRICKS WITH A LOW BULK DENSITY

This is a continuation of application Ser. No. 692,747, filed June 4, 1976, now abandoned.

The invention relates to a method of producing sand-lime bricks with a low bulk density and a green brick strength of $\geq 1$ kp/cm$^2$ wherein a mixture of sand, lime and water is produced and then compressed in moulds of a compactor to form green bricks which are subsequently cured in an autoclave.

In the wake of continuous cost increases in the energy supply field, efforts are at present being intensified towards improving the heat insulation properties of building bricks by reducing the bulk density thereof. Fundamental ways of achieving this include increasing the number of voids in the brick, the use of lightweight aggregates and the production of artificial air voids. The reduction of brick bulk density as a prerequisite for improving heat insulation properties creates considerable difficulty on account of the reduced green strength associated therewith, particularly in the case of sand-lime bricks, since with the green strength of the brick having been reduced the stresses resulting from the previously used transporting or conveying operations cannot be absorbed without intolerable damage being done to the bricks. According to the previously known method of producing sand-lime bricks of low bulk density, to achieve sufficient green brick strength necessitates a high degree of minimum compaction which counteracts a low bulk density in the brick.

The problem for the present invention is to achieve, with a method of the initially described type, a lower bulk density without substantially impairing green brick strength so that bricks produced in accordance with the method can be conveyed by the previously known devices. It is to be understood that by the use of the term "brick" in the specification and claims applicants mean a sand-lime building block of any shape and size.

This problem in a method of the type mentioned at the beginning of the specification is solved in accordance with the invention by adding at least 1% by weight of cement to the mixture prior to introduction into the compactor, and then compressing the mixture in a compactor at pressures of less than 150 kp/cm$^2$. Prior to the compacting operation the cement, which acts as a binder and is added to the mixture consisting essentially of sand, lime and water, causes strength-forming reactions to come into play which give the unfinished brick the desired strength even when little compacting occurs in the compactor.

The invention provides that, after addition of the cement, the mixture be also retained in a mixer or an intermediate silo for approximately one hour to initiate strength-forming reactions and subsequently conveyed to the compactor.

The invention further provides that the cement to be used be a quick-setting cement so that the time the mixture is maintained in front of the compactor can be kept relatively short.

The invention further proposes that lightweight aggregates be added either fully or partially to the mixture in place of the sand. Through their own low bulk density these lightweight aggregates are instrumental in reducing the bulk density of the brick. In contrast to conventional sand-lime brick production, they are not destroyed by the low compacting pressures which are possible in this case.

It is further provided that air-entraining or foam-forming agents be added to the mixture. In this way with the low compaction pressures the brick bulk density can be further reduced.

Through the use of cement as a binder it is possible, in accordance with a further proposal of the invention, to produce bricks of single-sized aggregates having a particle size of less than 0.25 mm. These single-sized aggregates or sand-like grains lead to a reduction in brick bulk density and therefore to an improvement in heat insulating properties while maintaining the strength required in the brick.

The invention further proposes that the bricks be provided with a porosity of $\geq 25\%$. This porosity can be produced in all brick sizes in use to improve heat insulating properties without the strength of the bricks falling below the required value.

In accordance with the invention it has been found to be advantageous if 10% by weight of CaO, 5% by weight of water in addition to the water for slaking, 81% by weight of sand having a particle size between 0 and 2 mm and 4% by weight of quick-setting cement are mixed together and the mixture is compacted at a pressure of 10 kp/cm$^2$ after being left to stand for 30 minutes. This low pressure, which is only a fraction of the pressure normally required in the production of sand-lime bricks which is of the order of approximately 150 kp/cm$^2$, is also advantageous in view of the stresses to which the necessary compactor is subjected.

In accordance with a further proposal of the invention the mixture, after addition of the cement, is vibrated or acted upon by tamping rods.

In this manner the brick bulk density may be further reduced to improve heat insulating properties. Moreover, only a relatively low expenditure on apparatus is necessary with this method of procedure.

Finally the invention proposes that the compacting of the mixture be effected by vibration alone acting on the moulds. This leads to the compactor being particularly simple in design.

In accordance with a first embodiment a mixture comprising 10 parts by weight of CaO, 5 parts by weight of water in addition to the necessary water for slaking and 81 parts by weight of sand is produced in a mixer. Sand having a particle size $\leq 2$ mm is used in this case. 4 parts by weight of quick-setting cement are added to this mixture. The mixture thus obtained, i.e.

10% by weight of CaO
5% by weight of water (in addition to the necessary water for slaking)
81% by weight of sand
4% by weight of quick-setting cement, is conveyed to an intermediate silo where it is left for approximately 30 minutes. Strength-forming or hardening reactions in the cement are initiated in this silo.

The mixture is then conveyed into moulds in a compactor. Here a pressure of approximately 10 kp/cm$^2$ is exerted on the mixture, this pressure being equal to about 1/15th of the pressure hitherto used for compacting in the production of sand-lime bricks.

The bricks thus produced are removed from the compactor in the conventional manner and transferred to an autoclave. After leaving the compactor the brick have a green strength of approximately 1.6 kp/cm$^2$. In this connection the bulk density of the brick material prior to hardening is approximately 1.7 kg/dm$^3$.

As a result of a brick green strength of approximately 1.6 kp/cm² which is achieved despite a relatively small degree of compaction, the bricks obtained in this manner can be easily conveyed by the devices hitherto used in sand-lime brick production.

In accordance with a second embodiment a mixture comprising 7 parts by weight of CaO, 7 parts by weight of water in addition to the necessary water for slaking and 80 parts by weight of sand are produced in a mixer. Sand having a particle size of up to 2 mm is used in this case. 6 parts by weight of quick-setting cement are added to this mixture. Then 30 l of a foam-forming agent are added to 100 kg of the thus obtained mixture of:

7% by weight of CaO
7% by weight of water (in addition to the necessary water of slaking)
80% by weight of sand
6% by weight of quick-setting cement.

The mixture thus obtained is conveyed to an intermediate silo where it is left for approximately 30 minutes. Strength- or hardness-forming reactions in the cement are initiated in this silo.

The mixture is then conveyed into moulds in a vibrating machine where it is compacted. The machine has a vibration frequency of 150 Hz with an amplitude of 2 mm. The vibration time is 20 seconds. In this compacting operation there is no load concentrated on the mixture in the moulds.

The bricks thus produced are removed from the compactor in the conventional manner and transferred to an autoclave. After leaving the compactor the bricks have a green strength of approximately 1.2 kp/cm² and, prior to hardening, a bulk density of 1.4 kg/dm³. The green strength thus obtained is still sufficient to enable the bricks to be conveyed by the devices hitherto used in sand-lime brick production.

The mixture can alternatively be compacted by means of tamping rods instead of by the vibration machine used in this embodiment.

All the previously described embodiments can be simply modified by replacing the sand portion entirely or partially with lightweight aggregates.

At the same time or as an alternative, foam-forming agents can be added to the mixture prior to compaction.

Moreover, simultaneously with each individual or all the previously described measures for reducing bulk density or as an alternative thereto, single-size aggregates having a particle size of less than 0.25 mm can either partially or fully replace the normal sand portion.

In any case the bulk density can additionally or alternatively be reduced by arranging voids in the brick to produce a porosity of 25% or more.

Particularly in a case where the mixture is compacted by means of a vibrating machine, it can be advantageous, in accordance with a further embodiment of the method of the invention, to add to the mixture aggregates having a water-saving and/or liquefying effect, as are already known in concrete manufacture.

In all the described embodiments methyl cellulose, for example, or any known stabilizer producing a similar effect can be added to the mixture in order to counteract and decomposition or disintegration of the mixture components in this manner and, if required, to obtain a certain bonding effect.

We claim:

1. A method for producing a sand-lime building brick of low bulk density comprising the steps of:

(a) preparing a mixture of sand, lime, water and cement, said mixture consisting essentially of sand, lime and water and also including a relatively small amount of cement as a binder, said cement being present in relatively small amount in relation to the total amount of said sand, lime and water, said cement being present in an amount in excess of 1% by weight to provide said mixture with a green strength of at least 1 kg/cm² subsequent to compaction of said mixture;

(b) compacting said mixture in a mold at a pressure of less than 150 kg/cm² to form green brick;

(c) removing said green brick from said mold;

(d) transporting said green brick to an autoclave; and (e) curing said green brick in the autoclave to form said building brick.

2. The method of claim 1, in which the compacting step is carried out by means of vibrating said mixture within said mold.

3. The method of claim 1, in which the mixture is left to stand for up to one hour following addition of the cement to initiate strength-forming reactions before the mixture is compacted.

4. The method of claim 1, in which the cement is a quick-setting cement.

5. The method of claim 4, in which the quick-setting cement is added to the mixture in an amount ranging from at least about 1% to about 6% by weight of cement based on the weight of the mixture.

6. The method of claim 1, in which the sand is at least partially replaced by light-weight aggregates.

7. The method of claim 1, in which foam-forming agents are added to the mixture prior to compaction.

8. The method of claim 1, in which the sand has a particle size of less than 0.25 mm.

9. The method of claim 1, in which the bricks have a porosity of at least 25%.

10. The method of claim 1, in which the mixture comprises 10% by weight CaO, 5% by weight of water in addition to the necessary water for slaking, 81% by weight of sand with a particle size of up to 2 mm and 4% by weight of quick-setting cement and in which the mixture is left to stand for about ½ hour and then compacted at a pressure of 10 kp/cm².

11. The method of claim 1, in which stabilizers are added to the mixture to prevent decomposition.

12. In a method for producing a sand-lime building brick by molding a mixture consisting essentially of sand, lime, and water in a mold under pressure to form green brick, removing the green brick from the mold and curing the green brick in an autoclave to produce said building brick, the improvements of: lowering the bulk density of the building brick by incorporating in said mixture a relatively small amount of cement as a binder, said amount being small in relation to the total amount of said sand, lime and water, and compacting said mixture at a pressure less than 150 kg/cm² to form the green brick, said cement being present in said mixture in an amount sufficient to produce a green brick having a strength of at least 1 kg/cm².

13. The method of claim 12, in which said compacting step is carried out by vibrating said mixture within said mold.

14. The method of claim 12, in which the cement is a quick-setting cement.

15. The method of claim 12, in which the bricks have a porosity of at least 25%.